C. Amazeen,

Sawing Stone.

N° 14,342.  Patented Mar. 4, 1856.

UNITED STATES PATENT OFFICE.

CHRISTOPHER AMAZEEN, OF NEW CASTLE, NEW HAMPSHIRE.

MACHINE FOR SAWING MARBLE IN TAPER FORM.

Specification of Letters Patent No. 14,342, dated March 4, 1856.

*To all whom it may concern:*

Be it known that I, CHRISTOPHER AMAZEEN, of New Castle, in the County of Rockingham and State of New Hampshire, have invented a new and Improved Machine for Sawing Marble Blocks in Polygonal Taper Form; and I do hereby declare that the following is a full, clear, and exact description of the same, reference being had to the annexed drawings, making a part of this specification, in which—

Figure 1:
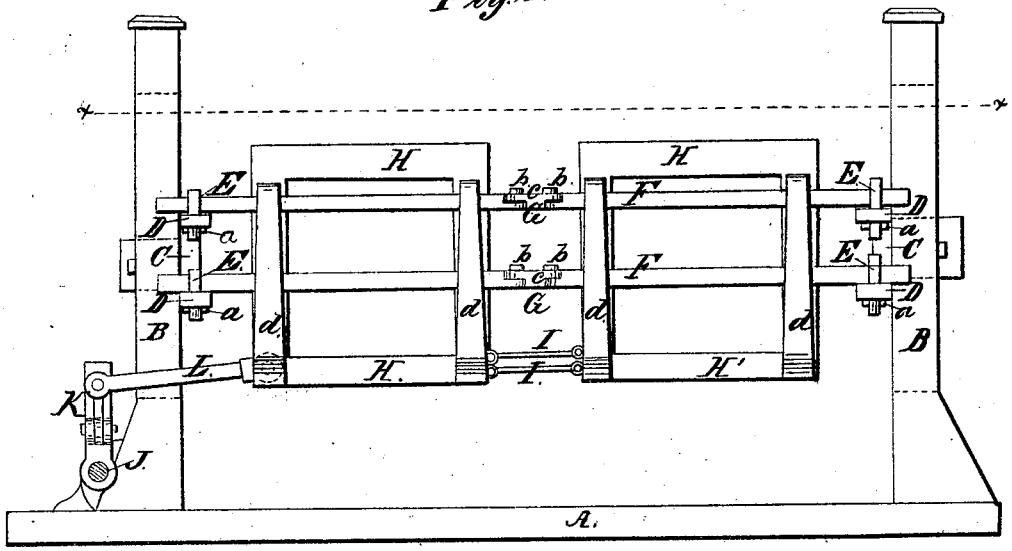
Figure 2:
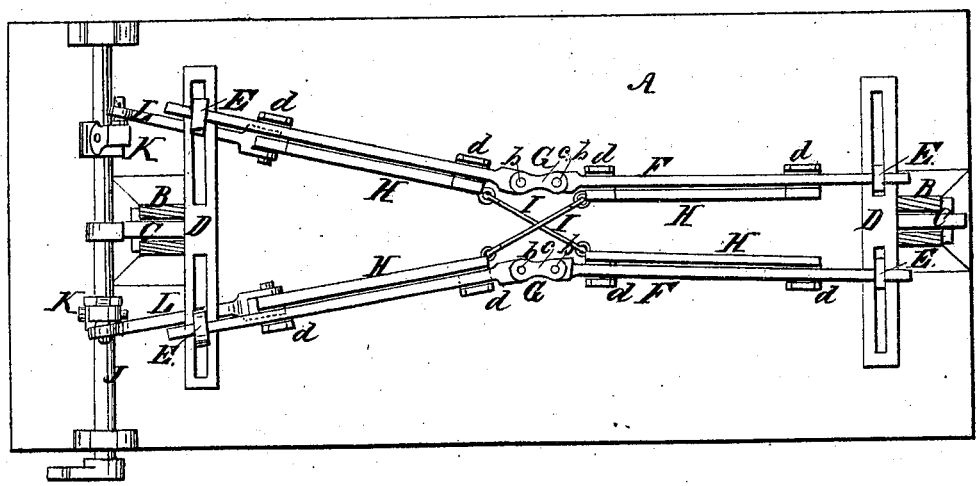

Figure 1 is a side view of my improvement. Fig. 2 is a horizontal section of ditto, (x), (x), Fig. 1, showing the plane of section.

Similar letters of reference indicate corresponding parts in the two figures.

The nature of my invention consists in the employment or use of adjustable jointed guide bars arranged as will be presently shown, whereby two pairs of saw frames may be used at the same time and driven from one shaft, and the two opposite sides of two marble blocks sawed in taper form at the same time.

To enable those skilled in the art to fully understand and construct my invention, I will proceed to describe it.

A, represents a flooring or bed piece on which two uprights B, B, are secured. These uprights are slotted vertically and have each a block C, fitted in the slots which blocks are allowed to slide freely up and down in the slots. To each block C, there is attached two horizontal bars D, D, one at the upper end and the other at the lower end of the blocks, see Fig. 1. The bars D, D, are slotted vertically and have guides E, fitted in the slots. The guides may be moved in the slots and secured at desired points by keys (a), or in any proper manner. There are two guides in each bar.

F, represents guide bars the ends of which are fitted in the guides E, the bars F, are jointed at their centers as shown at G, the ends of the bars being connected by bolts (b), to links (c).

H, represents the saw frames which have vertical strips (d), attached to their outer sides, the bars F, being fitted between the strips (d), and frames H. There is a saw frame at each side of the joints of the guide bars and the frames H, are connected by diagonal rods I, each rod connecting one of the front and one of the back saw frames as clearly shown in Fig. 2. H', are the saws attached to the lower parts of the saw frames.

J, is a shaft to which two jointed arms K, K, are attached. These arms have pitmen L, L, attached to them, one to each, and the pitmen are also attached to the two front saw frames H, H.

The marble blocks to be sawed are placed underneath the saws H', a block underneath each pair and the saw frames H, are adjusted or placed obliquely with each other corresponding to the taper intended to be given the sides of the blocks by loosening the keys (a), and adjusting the guide bars F. A reciprocating or rocking motion is then given the shaft J, in any proper manner and the saws will cut two opposite sides of the two blocks in taper form at the same time the blocks C, descending in the uprights B, B, as the saws cut. When two opposite sides of the marble blocks are cut the blocks are turned upon the flooring or bed piece A, properly blocked up and the remaining sides sawed. One pair of saws may if desired be set more or less obliquely with each other than the other pair in consequence of the joints at their centers.

Having thus described my invention, what I claim as new and desire to secure by Letters Patent, is—

The jointed guide bars F, F, arranged as shown, so that two pairs of saw frames may be driven from one shaft, and one pair of saw frames be set, if desired, at different angles or degrees of obliquity from the other pair, for the purpose specified.

CHRISTOPHER AMAZEEN.

Witnesses:
WM. KENNARD,
THOS. E. OLIVER.